July 28, 1936. G. M. PESTARINI 2,049,389
DIESEL ELECTRIC POWER SYSTEM
Filed June 2, 1934
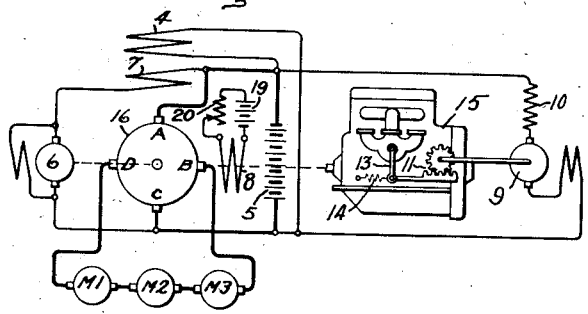
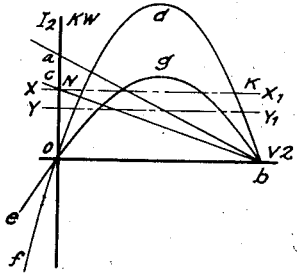
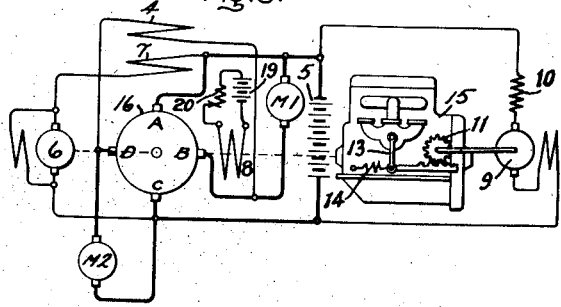
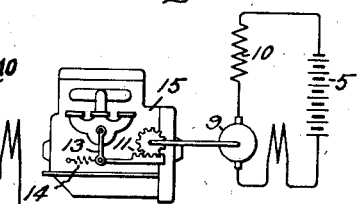
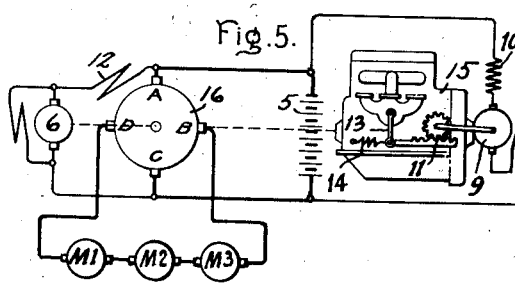
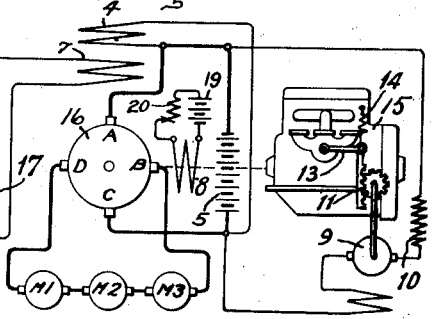
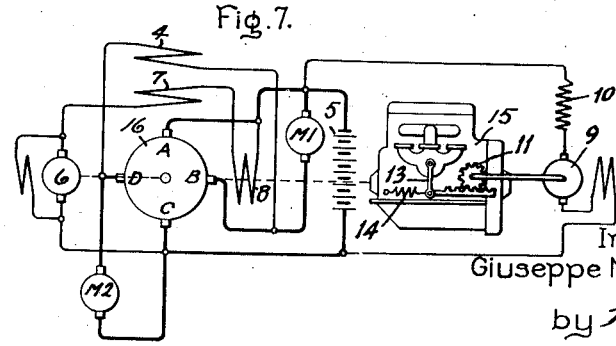
Inventor:
Giuseppe Massimo Pestarini,
by Harry E. Dunham
His Attorney.

Patented July 28, 1936

2,049,389

UNITED STATES PATENT OFFICE 2,049,389

DIESEL ELECTRIC POWER SYSTEM

Giuseppe Massimo Pestarini, Grant City, Staten Island, N. Y.

Application June 2, 1934, Serial No. 728,706

15 Claims. (Cl. 290—16)

This invention relates to electrical power plant of the kind comprising a metadyne generator driven from a prime mover co-operating with electrical storage means.

An advantageous application of the present invention is to a Diesel electric traction system wherein the secondary circuit of a metadyne generator supplies the electric traction motors. In such cases the load taken from the metadyne generator will of course vary appreciably, at the same time however in order to obtain maximum output from the prime mover in cases where this is constituted by a Diesel engine it is desirable that the speed of the engine shall be maintained approximately constant at the maximum permissible value during such time as maximum power output is required. The main object of the invention is to provide an improved arrangement of apparatus whereby the prime mover supplies approximately constant power while the speed of the prime mover may be maintained substantially constant within predetermined limits, the storage means, for example electric accumulators, being arranged to supply the additional power required during periods of high load and to store power during periods of light load.

A metadyne transformer briefly comprises an armature similar to that of a direct current machine which is rotated at constant speed and which has in its simplest form two pairs of brushes arranged at right angles with each other. Current is supplied to the one pair of brushes which generates a flux producing an electromotive force between the second pair of brushes, across which brushes the load or consumption circuit is connected. The primary circuit is normally supplied from a source of substantially constant potential and where this is the case and the speed of rotation remains constant the main characteristic of the machine is to supply a constant current output. In the metadyne transformer motoring and generator torques are produced which are substantially equal and opposite. In order, however, that the machine shall act as a generator this balance of torques is upset by means of a field winding generally referred to as a primary variator winding arranged to produce a flux along the primary brush axis and in the same direction as the flux produced by the primary current. The effect of the primary variator winding is to reduce the value of the primary current required to obtain a predetermined primary flux and this reduction in primary current reduces the motoring torque with the result that mechanical power is now taken from the shaft by the metadyne.

For a more complete description of the metadyne generator reference may be made to the specification of French Patents No. 647,855 dated February 25, 1922, No. 623,438 dated January 27, 1926 and No. 637,946 dated November 25, 1926. A description of the general construction and operation of metadyne transformers, generators and motors treated mathematically in considerable detail will also be found in a paper entitled "Esquisse sur la Metadyne" by G. M. Pestarini in the Bulletin Scientifique A. I. M. No. 4 April 1931 of L'Association des Ingenieurs Electriciens, published by the Institut Electrotechnique Montefiore, Liege.

According to the present invention an electrical generating plant comprises a prime mover mechanically coupled with a metadyne generator the secondary circuit whereof supplies a varying load, said metadyne generator having an electrical storage means connected across its primary brushes and in which a winding is provided producing a component of flux in the direction of the primary axis so excited as to maintain the load on the prime mover at selected constant values.

According to one embodiment of the invention a regulator dynamo electric machine is mechanically coupled with the metadyne generator and is electrically connected across the storage means through a primary variator winding on the metadyne stator adapted to produce a magnetic flux having a component in line with the primary brushes, the electromotive force of the regulator dynamo acting in opposition to that of the storage means. Usually in such a case a governor on the prime mover may be dispensed with.

Alternatively the variator winding may be connected across the storage means or across separate storage means such as an additional battery; in such a case a governor will as a rule be required on the prime mover.

Conveniently two such variator windings may be employed, one excited by means of a regulator machine and the other from the storage means; such an arrangement again enables the prime mover governor to be dispensed with. In cases in which the term "primary brush axis" is employed herein it will be understood that this term is intended to indicate the primary commutating axis or the axis of the flux produced by the primary armature current and a corresponding meaning must be given to the term "secondary brush axis". The term "brush axis" is employed for convenience in view of the nature of the diagrams.

In order that the invention may be more clearly understood reference will now be made to the accompanying drawing, in which:—

Figure 1 shows diagrammatically the electrical connections of a plant including a metadyne generator supplying three electric motors.

Figure 2 is a graph showing the characteristics of the plant, whilst

Figure 3 is a modified form of plant in which the motors are connected across the metadyne in the arrangement known as a figure of eight.

Figure 4 shows a detail arrangement for preventing overcharging of the battery.

Figure 5 is a further modification of the arrangement shown in Figure 1, in which the primary regulating winding instead of being arranged along the primary brush axis is arranged obliquely thereto.

Fig. 6 illustrates a modification of the arrangement shown in Fig. 1, wherein the primary regulating variator winding is energized from a separate source of electrical power supply.

Fig. 7 is a modification of the arrangement illustrated in Fig. 3 wherein the variator windings on the primary and secondary commutating axes are connected in series.

In Figure 1 the metadyne 16 is shown as having primary brushes A and C and secondary brushes B and D. The secondary circuit is shown as supplying three motors M1, M2, and M3 which are connected directly across the secondary brushes. The winding 4 is adapted to produce a flux in the same direction as that produced by the primary current of the metadyne so as to upset the balance of torques and cause the metadyne to act as a generator instead of a transformer, as above explained. Across the primary brushes A and C there is connected a secondary battery 5. In parallel with this battery there is shown a regulating dynamo electric machine 6 in series with a second primary variator winding 7 hereinafter called a regulator winding. The regulating machine 6 which may be shunt or separately excited is mechanically coupled with the metadyne and is arranged to generate an electromotive force in opposition to that of the battery. The excitation of the regulating machine 6 is so arranged that at the critical speed selected for the running of the plant the electromotive force generated is equal and opposite to that of the battery so there will be no current flowing through the primary regulator winding 7. For conditions of running, when the speed of the shaft tends to fall below normal, a primary flux will be produced by the primary variator winding 7 which flux will be set up by a small primary current obtained from the battery 5. Should, however, the load caused by the motors fall off, the load on the prime mover 15 will be consequently reduced and this will cause the set to overspeed. Under these circumstances the electromotive force produced by the regulator 6 will be greater than that of the battery 5 with the result that it will cause a current to flow through the battery in the charging direction.

This latter current by its action on the primary variator winding 7 has the effect of decreasing and ultimately reversing the primary current of the metadyne, and it thus causes the metadyne 16 to charge the battery. A consideration of the magnetic excitation of the machine will readily illustrate this action. As stated above, under normal conditions the field exciting winding 7 is deenergized and does not affect the excitation of the machine. The field exciting winding 4 is connected across the battery 5 and therefore produces a constant component of magnetic flux along the axis of the primary flux. A field exciting winding 8 may be utilized to set up a flux of desired magnitude along the axis of the secondary flux. As stated above, if the load upon the metadyne 16 is decreased, the speed of the prime mover 15 tends to increase. This produces an increase in the voltage of the regulator dynamo 6, which causes a current to flow through the field exciting winding 7 in a direction such as to produce a magnetic flux in the same direction as the armature reaction produced by the primary current. As in any dynamo-electric machine, the internal potential difference between the brushes is composed of the resistance drop plus the electromotive force induced in the conductors between the brushes as they revolve in the magnetic field of the machine. In the present instance, for a given speed of rotation, the secondary voltage produced between the brushes B—D varies in accordance with the flux produced along the primary axis, which is the combined flux resulting from the field produced by the field exciting windings 4 and also 7, when the latter is energized, and the armature reaction produced by the primary circuit. An increase in the flux along the primary axis produces an increase in the secondary voltage and, for a given load upon the generator, this produces an increased secondary current. Since the excitation produced by the field exciting winding 4 is substantially constant, its effect may be neglected in the following considerations. The primary induced voltage is produced in the conductors between the primary brushes A—C by rotation in the magnetic field produced along the secondary axis. Since the component of excitation along the secondary axis produced by the field exciting winding 8 may be considered constant for a given set of conditions, the excitation along this axis may be considered to depend upon the secondary current. Thus, an increase in the secondary current for a given speed produces an increase in the primary induced voltage. By application of Kirchoff's voltage law, a decrease in the primary current necessarily results, since the balance of the primary voltages necessitates a decrease in the resistance drop of the machine. Thus, it is readily seen that by increasing the flux along the primary axis produced by the field exciting winding 7, the primary current may be reduced to zero to maintain the magnetic balance within the machine. A further excitation of this winding will necessitate a reversal of the primary armature reaction, requiring a reversal of the primary current. Under this condition, it will be seen that the voltage between the primary brushes A—C of the metadyne generator 16 will be greater than the voltage of the battery 5 and reversal of the primary current charges the battery.

In cases in which there is no variator winding 4 constantly excited the excitation of the regulator machine must be so adjusted that at the critical speed some current will flow through the winding 7 to ensure that the machine will act as a metadyne generator.

It will be appreciated that whilst the speed cannot be maintained absolutely constant at the critical speed by the arrangement described it can be maintained within limits within which the capacity of the prime mover will not be unduly reduced.

As stated above, the variator winding 7 may be energized from a separate source of electrical power supply. In Fig. 6, the energization of this field is produced by a battery 17 and varied by means of a field resistor 18. In such an arrangement, a governor will generally be required for controlling the power developed by the prime mover 15.

A particular case to consider is that in which the motors M are stationary so that the brushes B—D are virtually short-circuited, such a condition would arise in the case of a locomotive when stationary.

In such a case the metadyne would act as a generator supplying current from the primary brushes to the battery 5 the excitation in this case would be provided by the secondary current combined with the effect of the secondary variator 8 if used.

In Figure 1, 8 is an additional stator winding arranged in line with the secondary brush axis and suitably excited as by a battery 19 in series with a variable field resistor 20, the effect of this winding is to vary the value of the secondary current. In this respect it will of course vary the relationship between the generator torque and motoring torque. It will be appreciated that the regulator machine 6 acts as a speed governor and enables the usual governor equipment to be dispensed with. The regulator will act to maintain the speed substantially at the critical speed by adjusting the load on the prime mover 15. This adjustment is effected by either supplying power to the battery or other source of potential or by extracting power from it.

Thus the battery will behave as a reservoir of energy supplying part of the power during peak load and being charged during underloads.

In Figure 2, which shows graphically the action of the plant, current and power output (KW) are plotted as ordinates and secondary voltage as abscissae. The straight line ab represents the supposed current characteristic of the metadyne generator corresponding to the setting of the controller, the parabola odb represents the power taken by the motors, XX' represents the constant power output of the prime mover.

Then taking the line XX' as the axis of abscissae, the ordinates of the parabola, where the parabola lies below the line XX, represent power supplied to the battery and where the parabola lies above the line XX' the ordinates represent power taken from the battery. cb represents the metadyne generator characteristic for another position of the controller, whilst parabola ogb represents the corresponding power output curve.

The line YY₁ represents the reduced power output of the prime mover for this second controller position and where the parabola ogb lies below the line YY₁, the battery is charged, while the portion above the line YY₁ represents a condition of operation when the battery supplies power to the load.

Figure 3 shows an arrangement in which two motors M1 and M2 are connected across the metadyne in what is known as a figure of 8 connection, the motor M1 being connected across brushes A and B and M2 across brushes C and D, the regulator and battery are connected as before. The primary variator winding 4 again is shown excited from the secondary circuit.

In order to provide for reducing or stopping charging of the battery when the voltage reaches a given limit a relay responsive to the voltage of the battery may be arranged to act upon the prime mover control in such a way as to reduce the fuel input. Such a relay may, as shown in Figs. 1, 3, 4, 5, 6 and 7, consist of an electric motor 9 connected across the battery 5 in series with a resistance 10 to limit the current. The motor may as shown be arranged to move the prime mover control 13 against the action of a biasing spring 14 through the agency of a pinion and rack gear 11, the torque exerted by the motor being of course proportional to the battery terminal voltage.

In some cases it is desirable, in order to obtain the most economical results, to arrange for the stator winding to be excited by the regulator machine to act not only upon the current traversing the rotor of the metadyne generator through the primary brushes, but also upon the current taken through the secondary brushes, that is to say on the current circulating in the consumption circuit, that is, the current from the regulator winding may traverse a secondary variator winding 8 as well as the regulator winding 7, as shown in Fig. 7. In suitable cases the combined effect may be obtained by the use of a single pair of coils 12 in the main poles of the metadyne intermediate between the brushes DA and BC, as shown in Figure 5, or by a variation in the proportion of the turns on the poles of two axes at right angles. Such an inclined flux will have two components, one in the direction of the primary brush axis which causes an alteration in the primary current and the other in line with the secondary brush axis which causes an alteration in the secondary current.

Having now particularly described and ascertained the nature of my said invention and in what manner the same is to be performed I declare that what I claim is:—

1. A power system including a prime mover and a metadyne generator having an armature driven thereby, means including a primary brush set and a secondary brush set associated with said armature for providing a primary and a secondary circuit through said armature, said secondary brush set being electrically displaced from said primary brush set, and electrical load, means for connecting said electrical load to said metadyne generator, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, means dependent upon said electrical load for energizing said field exciting winding and for controlling the transfer of power between said source of electrical power supply and said metadyne generator, and means dependent upon the voltage across said source of electrical power supply and including a dynamo-electric machine connected to said source of electrical power supply for regulating the power developed by said prime mover.

2. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, means dependent upon said electrical load for energizing said field exciting winding, and means dependent upon the voltage across said source of electrical power supply for regulating the power developed by said prime mover.

3. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of substantially constant potential electrical power supply, means connecting said source of electrical power supply across said primary brush set, a field exciting winding arranged to produce a component of excitation along the primary commutating axis of said metadyne generator, and means dependent upon the speed of said metadyne generator and energizing said field exciting winding for controlling the transfer of power between said source of electrical power supply and said metadyne generator and for maintaining substantially constant load on said prime mover.

4. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load to said metadyne generator, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, means for energizing said field exciting winding, means varying the energization of said field exciting winding for controlling the current in said primary circuit, and means dependent upon the voltage across said source of electrical power supply for regulating the power developed by said prime mover.

5. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, means for energizing said field exciting winding, means varying the energization of said field exciting winding for controlling the current in said primary circuit, and means dependent upon the voltage across said source of electrical power supply and including a dynamo-electric machine connected to said source of electrical power supply for regulating the power developed by said prime mover.

6. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of substantially constant potential electrical power supply, means connecting said source of electrical power supply across said primary brush set for transferring power between said metadyne generator and said source of electrical power supply, a field exciting winding arranged to produce a component of excitation along the primary commutating axis of said metadyne generator, a regulator generator, and means connecting said regulator generator in opposition to the voltage of said source of substantially constant potential electrical power supply and across said field exciting winding for maintaining substantially constant load on said prime mover.

7. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of substantially constant potential electrical power supply, means for connecting said source of electrical power supply across said primary brush set, a field exciting winding arranged to produce a component of excitation along the primary commutating axis of said metadyne generator, a regulator generator, means for driving said regulator generator in a predetermined speed relation to the speed of said metadyne generator, and means including said source of electrical power supply and said regulator generator for energizing said field exciting winding and for maintaining substantially constant load on said prime mover, said last mentioned means being dependent upon the load on said metadyne generator.

8. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of substantially constant potential electrical power supply, means connecting said source of electrical power supply across said primary brush set for transferring power between said metadyne generator and said source of electrical power supply, a field exciting winding arranged to produce a component of excitation along the primary commutating axis of said metadyne generator, means for connecting said field exciting winding across said source of substantially constant electrical power supply, a second field exciting winding arranged to produce a component of excitation along the primary commutating axis of said metadyne generator, a regulator generator, and means connecting said regulator generator in opposition to the voltage of said source of substantially constant potential electrical power supply and across said second field exciting winding for maintaining substantially constant load on said prime mover.

9. A power system including a prime mover and a metadyne generator having an armature driven thereby, means including a primary brush set and a secondary brush set associated with said armature for providing a primary circuit and a secondary circuit through said armature, said secondary brush set being electrically displaced from said primary brush set, an electrical load, means for connecting said electrical load across said metadyne generator, a source of substantially constant potential electrical power supply, means connecting said source of electrical power supply across said primary brush set for transferring power between said metadyne generator and said source of electrical power supply, a field exciting winding arranged to produce a component of excitation along the primary commutating axis of said metadyne generator, means for energizing said field exciting winding in accordance with an electrical characteristic of said secondary circuit, a second field exciting winding arranged to produce a component of excitation along the primary commutating axis of said metadyne generator, a regulator generator, and means connecting said regulator generator in opposition to the voltage of said source of substantially constant potential electrical power supply and across said second field exciting winding for maintaining substantially constant load on said prime mover.

10. A metadyne generator having an armature provided with windings and a commutator connected thereto, means including a primary brush set and a secondary brush set associated with said commutator for providing a primary circuit and a secondary circuit through said armature, said secondary brush set being electrically displaced from said primary brush set, a field exciting winding arranged to produce a component of excitation along the primary commutating axis of said metadyne generator, means dependent upon an electrical characteristic of said secondary circuit for energizing said field exciting winding, a second field exciting winding arranged to produce a component of excitation along the primary commutating axis of said metadyne generator, a regulator dynamo-electric machine, means for driving said regulator dynamo-electric machine in a predetermined speed relation to the speed of said armature, a source of substantially constant potential electrical power supply, and means connecting said regulator dynamo-electric machine in opposition to the voltage of said source of substantially constant potential electrical power supply and across said second field exciting winding for controlling the power output of said generator.

11. A metadyne generator having an armature provided with windings and a commutator connected thereto, means including a primary brush set and a secondary brush set associated with said commutator for providing a primary circuit and a secondary circuit through said armature, said secondary brush set being electrically displaced from said primary brush set, a field exciting winding arranged to produce a component of flux along the primary commutating axis of said metadyne generator, means dependent upon an electrical characteristic of said secondary circuit for energizing said field exciting winding, a second field exciting winding arranged to produce a component of excitation along the primary commutating axis of said metadyne generator, a third field exciting winding arranged to produce a component of excitation along the secondary commutating axis of said metadyne generator, a regulator dynamo-electric machine, means for driving said regulator dynamo-electric machine in a predetermined speed relation to the speed of said armature, a source of substantially constant potential electrical power supply, and means connecting said regulator dynamo-electric machine in opposition to the voltage of said source of substantially constant potential electrical power supply and in circuit with said second and third field exciting windings for controlling the power output of said generator.

12. A metadyne generator having an armature provided with windings and a commutator connected thereto, means including a primary brush set and a secondary brush set associated with said commutator for providing a primary circuit and a secondary circuit through said armature, said secondary brush set being electrically displaced from said primary brush set, a field exciting winding arranged to produce a component of excitation along the primary commutating axis of said metadyne generator, means dependent upon an electrical characteristic of said secondary circuit for energizing said field exciting winding, a second field exciting winding for producing a component of excitation along the primary commutating axis of said metadyne generator, a regulator dynamo-electric machine, means for driving said regulator dynamo-electric machine in a predetermined speed relation to the speed of said armature, a source of substantially constant potential electrical power supply, and means connecting said regulator dynamo-electric machine in opposition to the voltage of said source of substantially constant potential electrical power supply and across said second field exciting winding for controlling the power output of said generator.

13. A power system including a prime mover and metadyne generator having an armature driven thereby, means including a primary brush set and a secondary brush set associated with said armature for providing a primary and a secondary circuit respectively therethrough, said secondary brush set being electrically displaced from said primary brush set, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, means for energizing said field exciting winding, and means varying the energization of said field exciting winding for controlling the current in said primary circuit.

14. In combination, an electric generator having an armature, means for driving said generator, a source of electric power supply, means for connecting said source of electrical power supply across said armature, an electrical load, means for connecting said electrical load across said armature, means dependent upon said electrical load for regulating an electrical characteristic of said generator, and means dependent upon the electrical potential across said source of electrical power supply for governing the power developed by said generator driving means.

15. A power system including a prime mover and a metadyne generator having an armature driven thereby, means including a primary brush set and a secondary brush set associated with said armature for providing a primary and a secondary circuit respectively therethrough, said secondary brush set being electrically displaced from said primary brush set, an electrical load, means for connecting said electrical load across said metadyne generator, a source of electrical power supply, means connecting said source of electrical power supply across said primary brush set for transferring power between said metadyne generator and said source of electrical power supply, a field exciting winding arranged to produce a component of excitation along the primary commutating axis of said metadyne generator, and means dependent upon said electrical load for energizing said field exciting winding and for controlling the transfer of power between said source of electrical power supply and said metadyne generator.

GIUSEPPE MASSIMO PESTARINI.